July 10, 1962 E. A. THOMPSON 3,043,428
GAGING AND SORTING APPARATUS
Filed Feb. 10, 1958 6 Sheets-Sheet 2
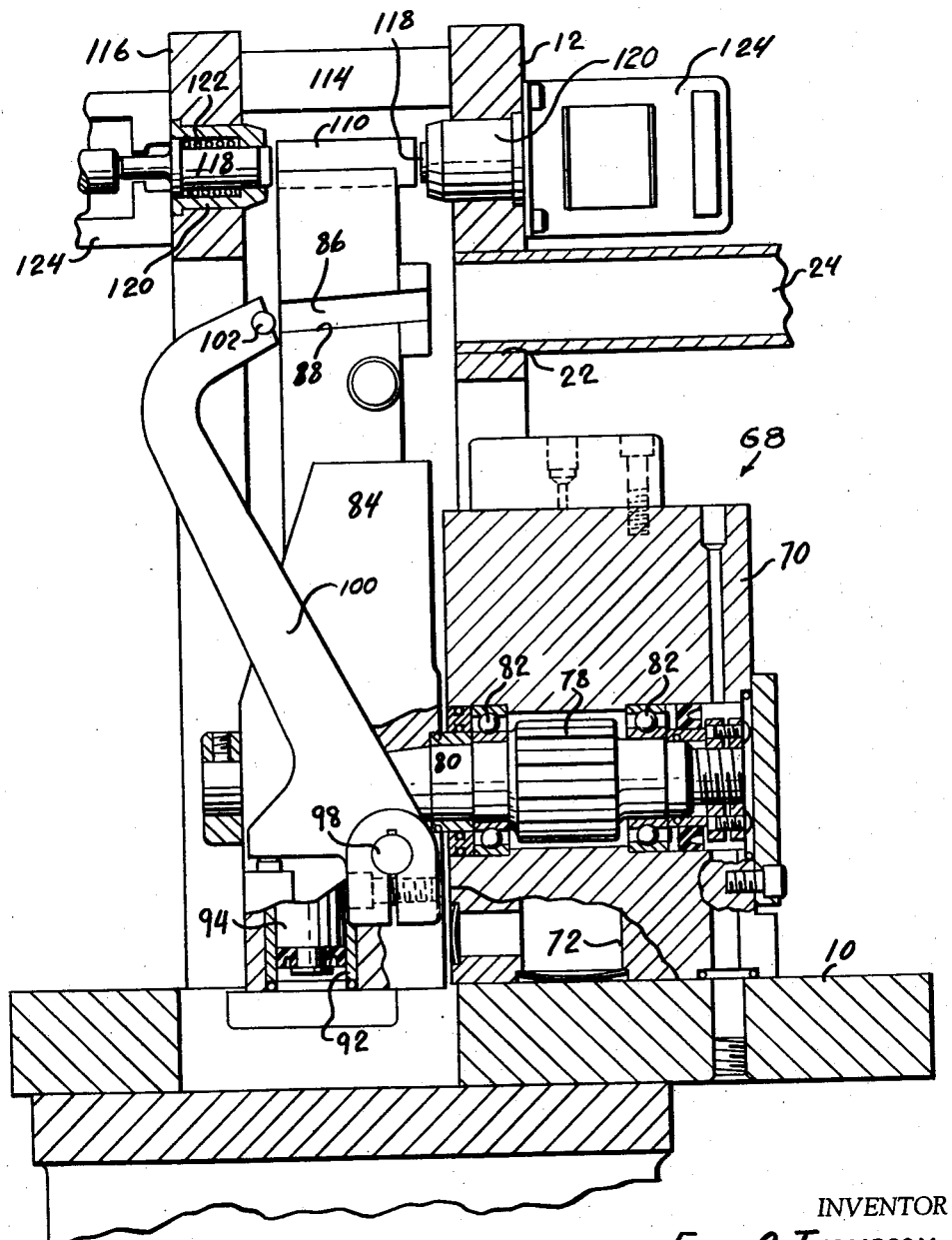
INVENTOR
EARL A THOMPSON
BY
ATTORNEY

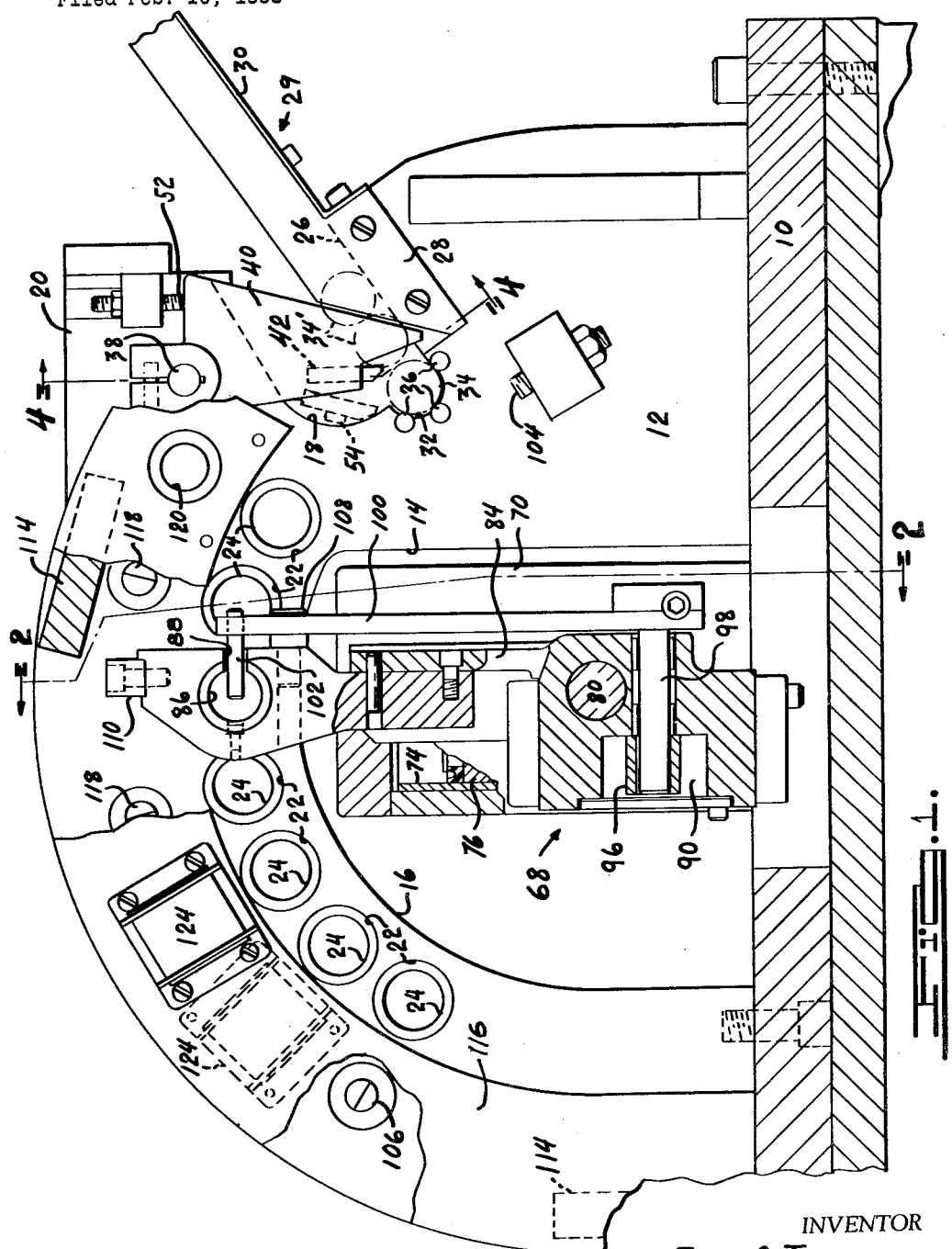

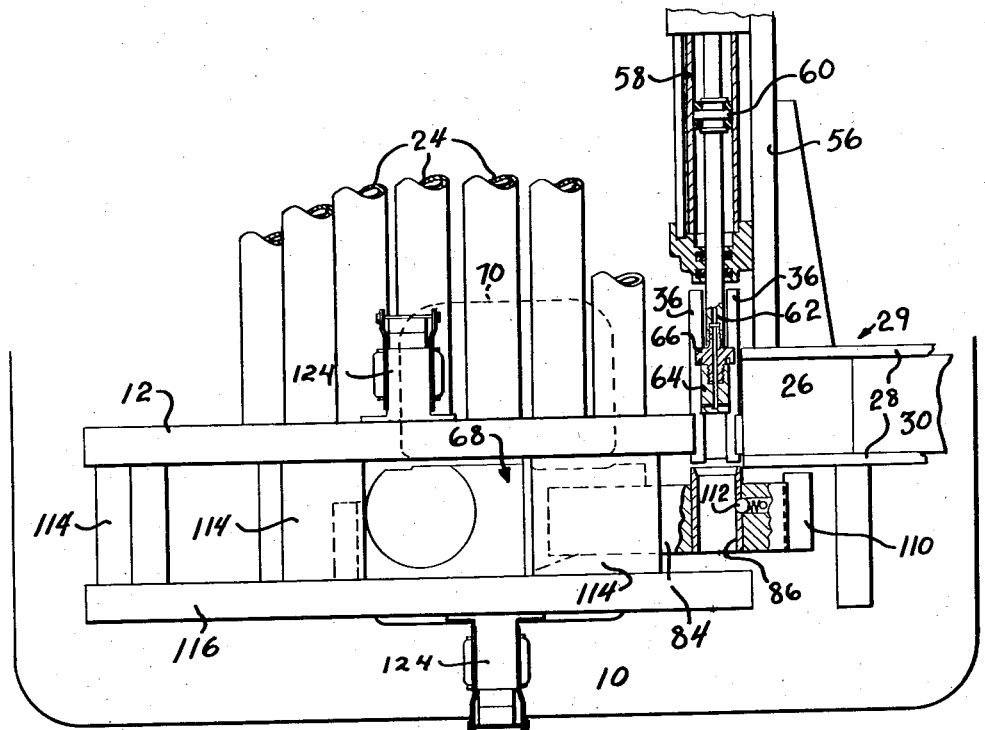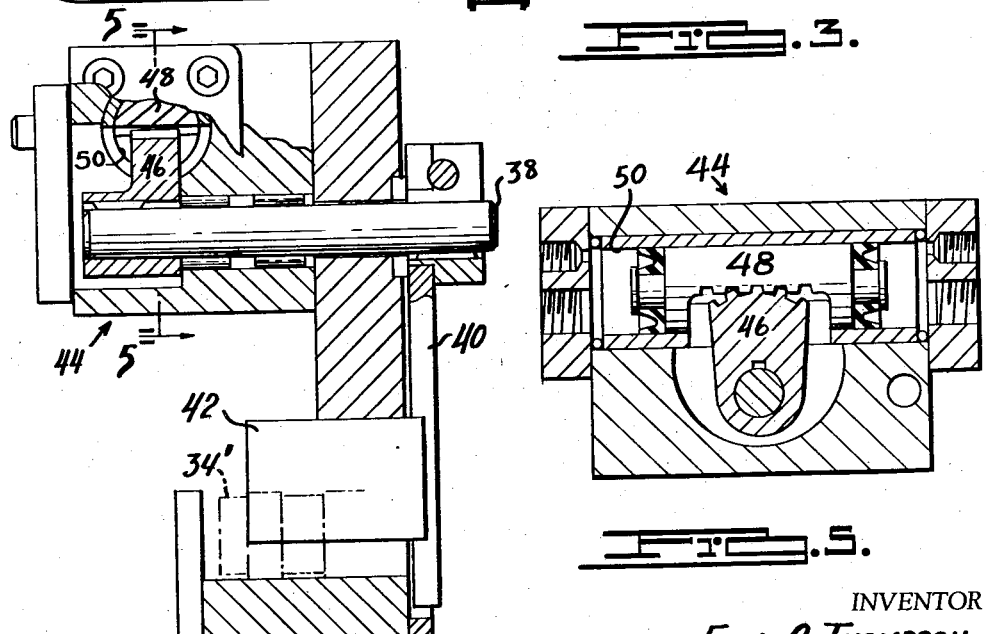

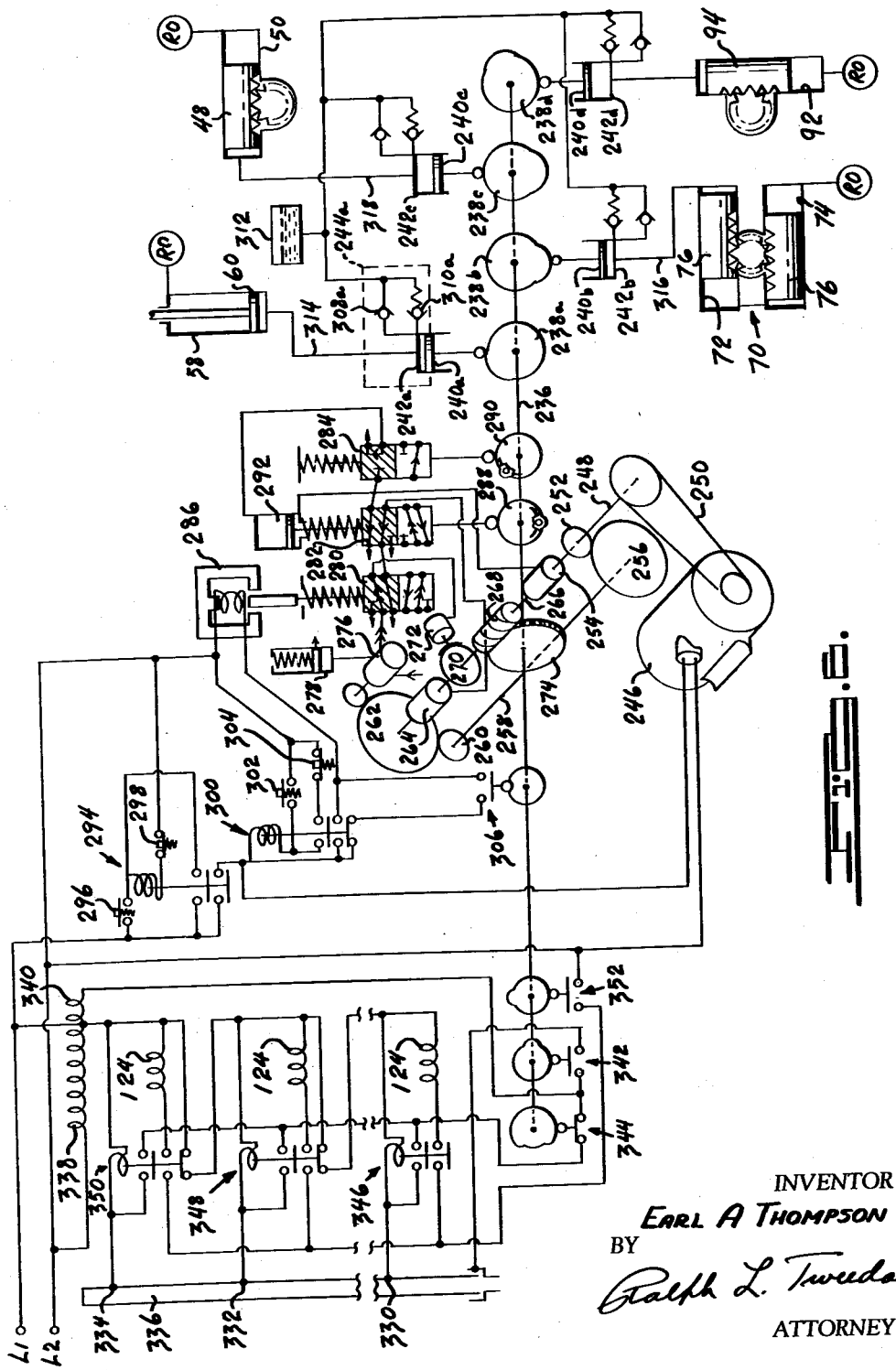

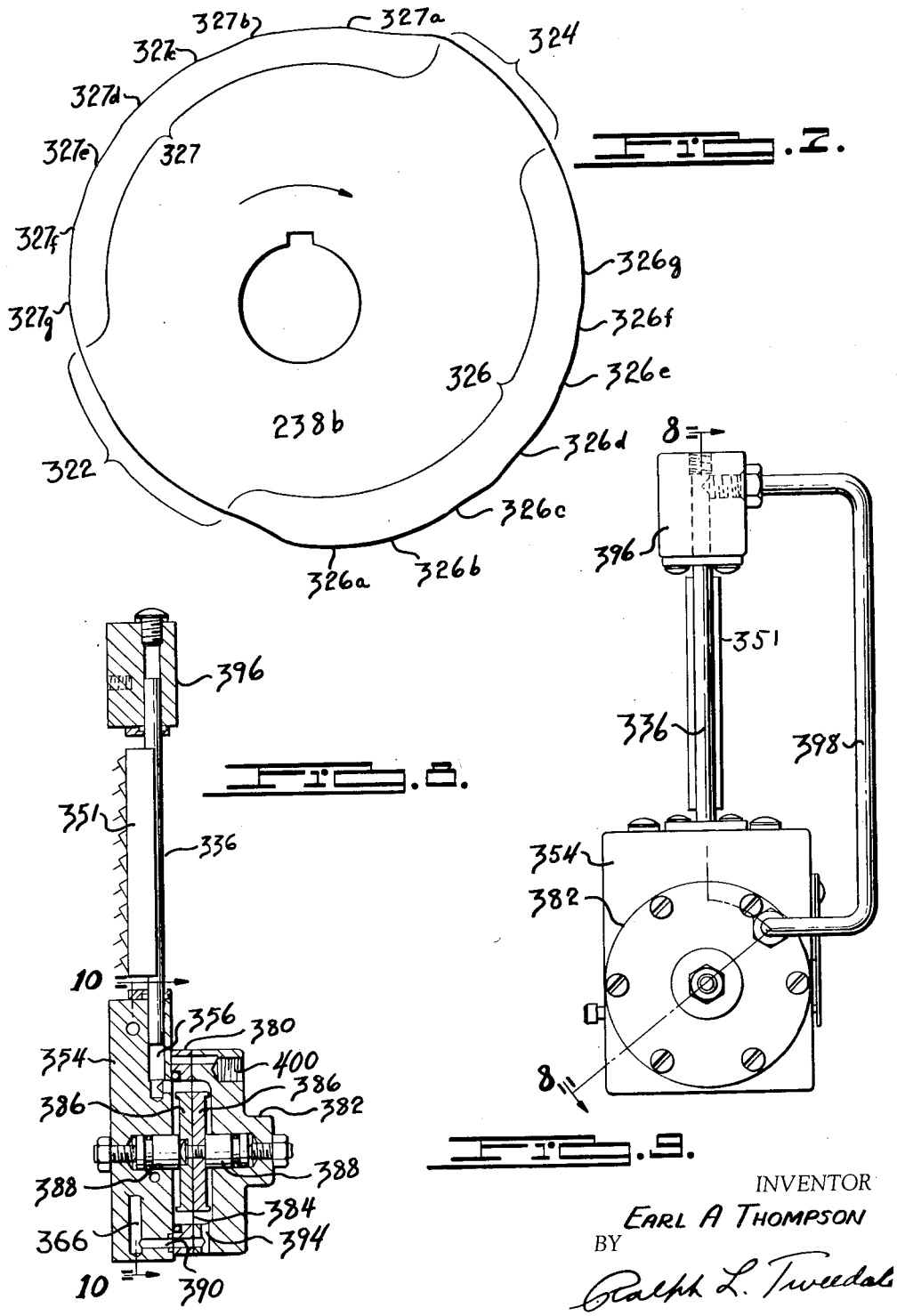

July 10, 1962 E. A. THOMPSON 3,043,428
GAGING AND SORTING APPARATUS
Filed Feb. 10, 1958 6 Sheets-Sheet 6
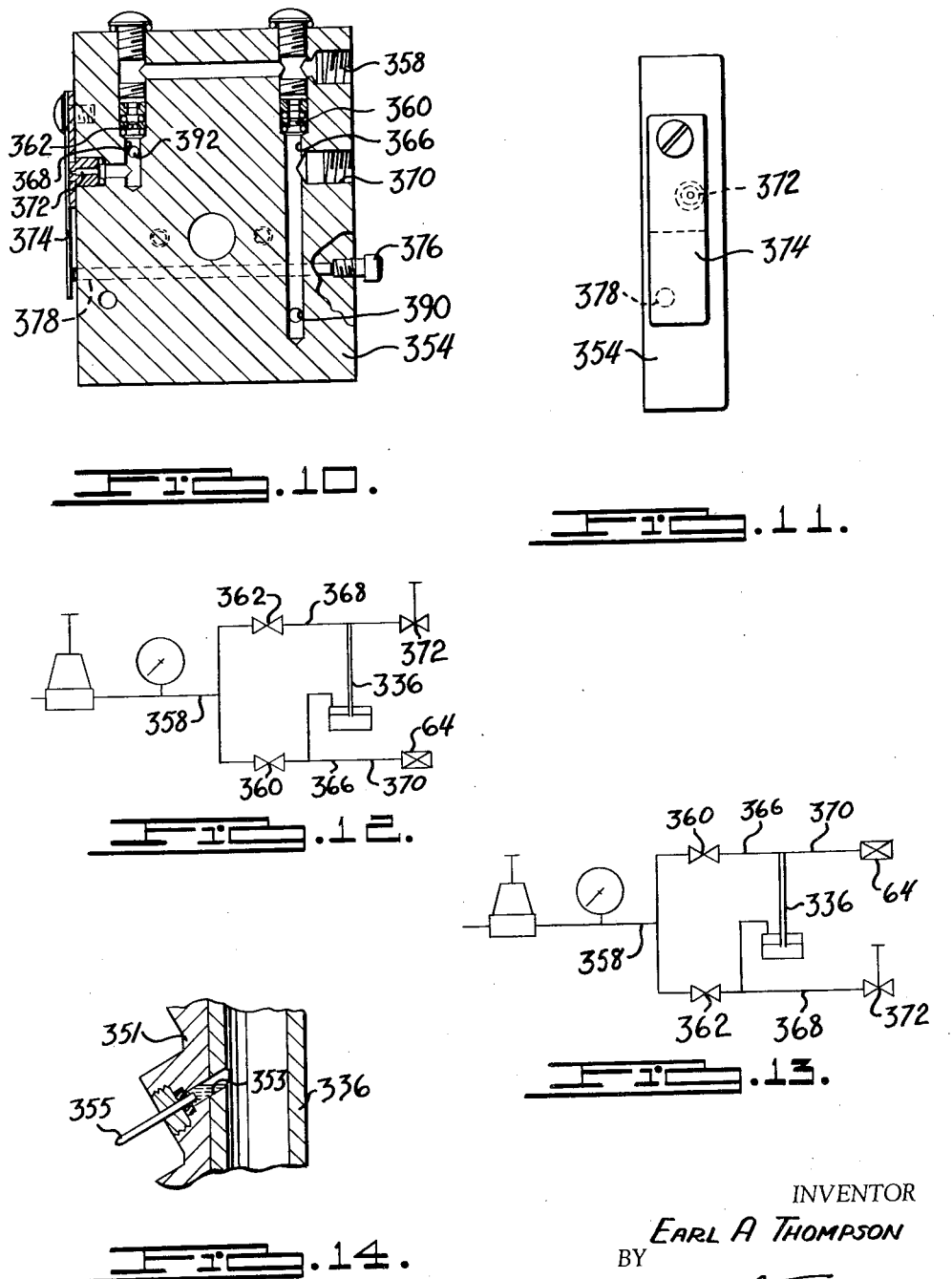
INVENTOR
EARL A THOMPSON
BY
Ralph L. Tweedale
ATTORNEY

United States Patent Office 3,043,428
Patented July 10, 1962

3,043,428
GAGING AND SORTING APPARATUS
Earl A. Thompson, 1300 Hilton Road, Ferndale, Mich.
Filed Feb. 10, 1958, Ser. No. 714,320
21 Claims. (Cl. 209—82)

This invention relates to devices for testing or measuring parts produced in quantity and for sorting or grading them according to size or other classification of characteristics tested. In many production processes, it is desired to test or measure 100% of the parts produced and to sort them into two or more classifications or grades in accordance with the value of the characteristic tested. Apparatus of this character may include a gaging or testing mechanism whereby a reading may be taken of some value or characteristic such as size, weight, or of some other physical or chemical characteristic, together with a work piece handling apparatus which will place successive work pieces in gaging position and deliver them selectively to any one of two or more discharge points, depending upon the value of the gage reading.

It is an object of the present invention to provide an improved automatic gaging and sorting apparatus having a high degree of sensitivity to extremely small variations in the characteristic being measured.

Another object is to provide an improved grading apparatus capable of both gaging and selectively sorting a succession of production parts at high speed.

Further objects and advantages of the present invention will be apparent from the following description, reference being had to the accompanying drawing wherein a preferred form of the present invention as illustrated.

In the drawings:

FIGURE 1 is a front view of a gaging and sorting apparatus embodying a preferred form of the present invention.

FIGURE 2 is a sectional view on line 2—2 of FIGURE 1.

FIGURE 3 is a top view of the apparatus shown in FIGURE 1.

FIGURE 4 is a fragmentary sectional view taken on line 4—4 of FIGURE 1.

FIGURE 5 is a sectional view taken on line 5—5 of FIGURE 4.

FIGURE 6 is a diagram showing certain electrical, mechanical and hydraulic components.

FIGURE 7 is a view of a cam used in the apparatus.

FIGURE 8 is a sectional view taken on line 8—8 of FIGURE 9 and showing a pneumo-electric gaging device forming part of the illustrated embodiment.

FIGURE 9 is a front view of the gaging device shown in FIGURE 8.

FIGURE 10 is a sectional view on line 10—10 of FIGURE 8.

FIGURE 11 is a side view looking from the left side of FIGURE 10.

FIGURE 12 is a pneumatic circuit diagram of the gaging apparatus.

FIGURE 13 is a similar circuit diagram showing an alternate method of connecting the parts.

FIGURE 14 is a fragmentary sectional enlargement of a portion of FIGURE 8.

The embodiment of the invention selected for illustration is one for the purpose of measuring the internal diameter of tubular parts which have been internally ground and for sorting them in seven ranges of size, including five usable ranges, oversize and undersize. The apparatus illustrated is particularly adapted for gaging the hollow bodies of hydraulic valve lifters, such as are used in automobile engines, although it will be understood that the invention may be embodied in other forms for gaging work pieces in accordance with almost any characteristic which is capable of measurement and for sorting them into almost any number of classifications of value of the characteristic being measured.

Referring now to the drawings, the work handling and sorting mechanism is illustrated in FIGURES 1 through 5 and includes a main base 10 to which is secured an upstanding plate 12. The plate 12 may have an interior opening defined by a vertical wall 14 and an arcuate wall 16. The outer periphery of the plate 12 may be substantially in the shape of a half circle with a generally U shaped notch 18 and an angular extension portion 20.

The plate 12 is provided with a series of work piece discharge stations comprising holes 22 formed in the plate for the reception of conveyor tubes 24. The tubes 24 may conveniently be formed of metal or plastic tubing and may be suitably curved to lead to individual collection or utilization zones, each of which is to receive sorted work pieces of a single classification.

Mounted on the plate 12 in alignment with the lower edge of the notch 18 is a rearwardly extending, inclined block 26 to which is secured a pair of side plates 28 forming the sides of an inclined work piece supply chute 29. A plate 30 is secured to the plates 26 and 28 to form the bottom of the chute. At the bottom of the chute the plate 12 is cut away, as shown at 32, to form an opening through which tubular work pieces such as the valve lifter bodies 34 may pass. Near the edge of the cut-away 32, there is mounted in the plate, and extending to the rear thereof, three guide rods 36 which form a grading station or rack upon which a work piece may be located for gaging purposes and from which it may be slid endwise toward the front of the machine to be delivered to a selected discharge point.

Pivoted upon an oscillatory motor shaft 38 is a generally triangular escapement arm 40 which carries a transverse blade 42. The blade 42, in the position shown in solid lines in FIGURES 1 and 4, occupies a position in the path of a work piece 34' so as to hold that work piece and the stack of work piece above it out of contact with the work piece 34 lying on the rails 36. When the arm 40 and blade 42 are swung to the position shown in dotted lines in FIGURE 1, the piece 34' may move into the position of the piece 34 which leaves it clear of the blade 42 during its return swing to the solid line position. Thus the escapement arm and chute form a supply station for work pieces to be sorted. The arm 40 extends downwardly sufficient to form an abutment for the end of the work piece 34 to prevent its endwise motion when the blade 42 is in the dotted line position.

The oscillatory motorshaft 38 is operated by a motor 44 of the hydraulic type, shown in FIGURES 4 and 5. This may include a toothed sector 46 secured to the shaft 38 and operated by a hydraulic piston 48 having rack teeth engaging the sector 46. The piston 48 is slidable in a cylinder 50 having suitable connections for hydraulic fluid at its opposite ends. An adjustable stop screw 52, FIGURE 1, limits the motion of the escapement arm 40 in one direction, while an abutment 54 on the blade 42 limits its motion in the opposite direction.

Mounted on a rearwardly extending bracket 56 is a hydraulic cylinder 58 having a double-acting piston and rod assembly 60 which is reciprocable in line with the axis of the work piece 34 lying on the rails 36. The rod 60 is hollow, as indicated at 62, to provide an air passage to a pneumatic gaging plug 64 mounted on the end of the piston assembly 60 and insertable in the bores of successive work pieces as they lie on the rails 36. The gage plug 64 may be of any suitable form which provides a restricted escape path for compressed air between the plug and the walls of the bore being gaged, the amount of restriction varying with the bore dimension. The piston and rod assembly 60 also carries a shouldered abutment member 66 adapted to engage the end surface of the work piece 34 for the purpose of pushing it forwardly off the end of the rails 36.

Mounted on the base plate 10 and extending through the opening 14 in the plate 12 is a handling arm assembly generally designated 68 and comprising a hydraulic motor block 70, having a pair of vertical cylinder bores 72 and 74. Slidable in the bores are a pair of cylindrical pistons 76 having rack teeth, not shown, which engage on opposite sides with a pinion 78 of an oscillatory output shaft 80 which is mounted on bearings 82 in the motor block 70. The shaft 80 carries, on its forwardly projecting end, a handling arm assembly 84, which has on its outer end a work piece receiving pocket 86, which is open at its opposite end and has a slot 88 along one side. The pocket 86 is located so as to be axially in alignment with the axis of the work piece in position 34 and also with each of the discharge stations 22—24.

The body of the work handling arm 84 is formed with a hydraulic motor section 90 having an oscillatory motor comprising a cylinder 92 and a piston 94 which may be similar to the cylinder 50 and piston 48, respectively, and which operate a sector arm 96 secured to an oscillatory output shaft 98. Suitable hollow passages, not shown, entering from opposite ends of the shaft 80 provide fluid connection to the ends of the cylinder 92. An ejector arm 100 is secured to the shaft 98 and has an ejector pin 102 which is swingable along the slot 88 to eject work pieces into any of the discharge conveyor tubes 24.

The oscillating stroke of the work handling arm motor 70 is sufficient to swing the arm 84 through an arc determined by the adjustable stop pin 104 at one end and by a fixed stop block 106 at the opposite end, both stops being carried by the upstanding plate 12. Stop 104 coacts with an abutment pin 108 on the arm 84, and stop 106 cooperates with one end of a rectangular stop block 110 on the end of the arm 84. The recess 86 may be provided with a spring loaded ball detent 112 for retaining a work piece in the recess.

Secured to and spaced from the plate 12 by rectangular web blocks 114 is an arcuate plate 116 for the purpose of supporting a number of solenoid controlled, selectively engageable stop blocks 118—see FIGURE 2. There are mounted in bushings 120 positioned in the plate 116 and spring urged to the outside by a compression spring 122. Each stop pin 118 is operated by an individual solenoid 124, all of which may be identical, and only one of which is illustrated in the drawings. Similarly on the plate 12 there is provided a corresponding set of stop pins 118 facing in the opposite direction and controlled by a similar group of individual solenoids. Each of the stop pins 118 is so positioned that when it is projected inwardly it will lie in the path of and intercept the stop block 110 carried by arm 84 and thus position the work receiving recess 86 adjacent a selected one of the discharge conveyor tubes 24. Individual solenoid controlled stop pins are provided for each of these tubes except the last one which is registered by means of the stop pin 106 in a fixed position.

For the purpose of actuating the four hydraulic motors associated with the work piece handling mechanisms, there is provided a mechanico-hydraulic drive and control system which is illustrated diagrammatically in FIGURES 6 and 7.

This system may be constructed as a self-contained unit having its own housing, not illustrated, which may be positioned at any convenient location in or adjacent to the machine and connected to the various hydraulic cylinders by suitable piping. The mechanico-hydraulic drive unit comprises a master camshaft 236 carrying a plurality of cams 238, the followers of which operate the transmitter pistons 240, each of which forms part of a liquid column type motion transfer device of which there are four shown in the diagram of FIGURE 6. An electric motor 246 is arranged to drive a self-controlled, two-speed transmission shown in the center part of FIGURE 6, and which drives camshaft 236. Each piston reciprocates in a cylinder 242 having a head 244 which contains a suitable inlet replenishing check valve and a high pressure relief valve, both of which communicate with a low pressure oil reservoir preferably formed in the housing enclosing the drive unit.

For turning the camshaft 236, the motor 246 drives the input shaft 248 of the two-speed transmission through a belt drive 250. The input shaft 248 drives a pinion 252 and also the input member of a hydraulically engaged, spring released clutch 254. Pinion 252 drives a gear 256 secured to a countershaft 258 which carries a pinion 260 at its opposite end. Pinion 260 drives a gear 262 and therewith constitutes a set of change speed gears. Gear 262 drives the input member of a second hydraulically engaged, spring released clutch 264. The driven members of clutches 254 and 264 are secured to the opposite ends of a shaft 266, having a worm 268 thereon and a brake drum 270. The latter has a spring biased hydraulic motor 272 for engaging the brake. Worm 268 drives a worm wheel 274 secured to the master camshaft 236.

For the purpose of automatically controlling the starting, stopping, and speed of the transmission, there is provided a hydraulic control pump 276 driven from gear 262, which may circulate a body of oil contained in the housing surrounding the transmission. The pump 276 may deliver to a combined accumulator and relief valve comprising a spring loaded piston 278 and also supplies oil to a bank of control valves 280, 282, and 284. In the diagrams each valve is shown as a two-position valve, spring biased to the position illustrated in which the connections shown in the cross-hatched rectangles are established. Single-headed arrows are used to indicate flow at reservoir pressure and double-headed arrows to indicate flow at pump delivery pressure. Each of the valves, when shifted, establishes the connections shown in the unhatched rectangles immediately below the hatched rectangles.

Valve 280 is arranged to be shifted by a solenoid 286. Valves 282 and 284 are arranged to be shifted by the adjustable cams 288 and 290, respectively, which are positioned on camshaft 236. In addition, the valve 282 has hydraulic holding cylinder 292 which holds the valve 282 in its shifted position until it is released by the shifting of valve 284. Valve 280 in the position shown delivers pressure fluid to engage the brake 272 and also exhausts fluid to release the low speed clutch 264. When shifted, valve 280 exhausts fluid to release brake 272 and supplies pressure fluid to engage the low speed clutch 264, subject, however to a conjoint control by the valve 282.

The latter valve, in the position illustrated, exhausts fluid to release the high speed clutch 254 and places the low speed clutch 264 under the control of valve 280. In its shifted position, valve 282, provided valve 280 has been shifted, delivers pressure fluid to engage high speed clutch 254 and exhausts fluid to release low speed clutch 264. As previously explained, the valve 284 is merely a reset valve for bypassing the holding cylinder 292 to permit valve 282 to return to its spring biased position shown in the drawings.

Thus, energization of solenoid 286 will start the camshaft rotating at slow speed. Thereafter, the cam 288 will shift the transmission to drive the camshaft at high speed, and still later the cam 290 will again shift the transmission to slow speed. So long as the solenoid 286 remains energized, the camshaft 236 will continue to rotate, first at a slow speed and then at a high speed during each revolution, controlling its own speed changes by operation of the cams 288 and 290.

For the purpose of controlling the drive motor 246 and solenoid 286, there is provided an electric control circuit connected between a pair of electric supply lines, designated L–1 and L–2. The circuit may include a master relay 294 of the holding type having a manual master start switch 296 and a manual master stop switch 298. Relay 294 controls the motor 246 and also a cycle control relay 300 of the holding type having a manual cycle start switch 302 and a manual cycle stop switch 304. The normally open contacts of relay 300, which are of the make-before-break type, control energization of cycle solenoid 286 directly. The normally closed contacts of relay 300 also control solenoid 286, but are in series with a cam switch 306 on the camshaft 236 and arranged to be opened once during each revolution thereof. The arrangement is such that when the cycle stop switch 304 is operated at any point in the rotation of camshaft 236, relay 300 will be deenergized, but solenoid 286 will remain energized until cam switch 306 opens at the predetermined stopping point. Operation of the master stop switch 298, however, will deenergize solenoid 286 immediately, regardless of the point in the cycle and will also deenergize motor 246.

The camshaft 236, as previously mentioned, drives a number of cam operated hydraulic pulsator sections, designated $a$ through $d$, inclusive. Each section may comprise units duplicating the single acting pulsating cylinder 242, the head 244 of which contains a replenishing check valve 308 and a spring closed relief valve 310. All the replenishing and relief valves are connected to a common oil reservoir 312 formed in the housing of the unit. The reservoir 312 is preferably subjected to a low, superatmospheric pressure by a body of compressed air or other pressure maintaining arrangement. Check valves 308 allow flow from the reservoir 312 to the cylinder 242, while relief valves 310 allow flow oppositely when the cylinder pressure exceeds a certain value. Thus, each of the pairs of valves 308 and 310 may be referred to as a balancing valve and serves to balance the volume of fluid in each of the liquid column sections, as will be later described.

The pulsator section "$a$" is connected by a closed liquid column line 314 with the head end of the hydraulic motor 58. Similarly, closed liquid column lines 316, 318, and 320 connect to one end of the motor cylinders 72, 50, and 92, respectively.

In order to assure proper synchronization of the driving and driven elements of each pulsator section, it is desirable to provide slightly more fluid displacement at the driving or transmitting elements 240—242 than is present in their respective fluid motors at the opposite end of the liquid column lines. Thus, at the end of each advancing stroke of a transmitter piston 240, a small amount of fluid will be discharged to reservoir 312 through its relief valve 310. This amount, plus any amount lost by leakage, will be returned to the liquid column at the end of the return stroke by the opening of replenishing valve 242.

In FIGURE 6, there are shown several circles marked "RO" and connected to the ends of the various motive cylinders which are opposite the liquid column connections. These symbols designate the return-oil connections by means of which each pulsator circuit is hydraulically biased so as to maintain the follower in close contact with the cam as the falling portion of the cam contour recedes from the follower. This bias is maintained by a high pressure accumulator, or oil reservoir, not shown, which may be provided with a manifold whereby all of the ports marked "RO" are joined together and to the high pressure reservoir. The showing of separate return oil connections in FIGURE 3 is indicative of any suitable type of biasing pressure source, whether it be a single accumulator or a multiplicity thereof, a pump and relief valve, or a pressure controlled variable displacement pump. Except for cam 238$b$, the contours of the individual cams 238 are, likewise, not illustrated in specific detail since they may be formed in accordance with usual practice so as to cause motivation of each of the respective hydraulic motors in accordance with the particular operating cycle desired for the machine. Likewise, the speed ratio between the high and low speeds of the camshaft 236 and the duration of the high speed portion of a cycle may be selected as desired through use of the appropriate change gears 260—262, and through adjustment of the cams 288 and 290. If desired, of course, the two-speed feature of the transmission may be omitted and the high speed clutch 254, the cams 238 and 290, and the valves 282 and 284 eliminated.

The contour of the cam 238$b$ is preferably similar to that shown in FIGURE 7, having an inner dwell arc 322 and an outer dwell arc 234 which are connected by rise and fall ramps 326 and 327. The ramps 326 and 327 are preferably divided into eight individual rising and falling steps, respectively. The first seven steps on the rising ramp produce a controlled acceleration and deceleration so that each of the points of junction 326$a$–326$g$ between adjacent steps has either zero or a very low rate of rise. The pattern for the falling ramp 327 may be similar to that of the rise ramp 326.

In operation, with the reservoirs "RO" and 312 filled with oil and with a body of compressed air at respectively high and low pressures, the master start switch 296 is closed to start the motor 246 of the mechanico-hydraulic drive and control unit. A series of cycles may then be initiated by operation of the cycle start switch 302. This energizes relay 300, which in turn energizes solenoid 286 to shift the starting valve 280 and cause operation of the camshaft 236 at its slow speed as previously explained.

During the slow speed portion of the cycle, the cam 238$b$ may have its inner dwell portion 322 pass under the cam follower and this interval may be utilized for taking the gage reading of a work piece in the position 34.

When this has been completed, the rapid speed cam 288 will shift the valve 282, which will be held in shifted position by cylinder 292, thus causing the master camshaft 236 to rotate at rapid speed, being driven through clutch 254 instead of clutch 264. Thereafter the first event will be the operation of piston 60 from its mid position to the extreme projected end of its stroke for the purpose of pushing the work piece endwise off from the rails 36 and into the recess 86 in the work piece handling arm 84. Next, the cam 238$b$ will cause actuation of the pistons 76 of the work piece handling motor 70 to swing the arm 84 counterclockwise in FIGURE 1. This takes place in incremental steps of acceleration and deceleration with a momentary pause or slow-down at each of the work piece discharging stations 24 as each dwell 326$a$, $b$, $c$, etc., comes under the follower. If none of the solenoids 124 have been energized, the arm will swing through its full stroke to bring the stop plate 110 against the fixed stop 106. Thereafter, the eighth step in the cam drives the transmitter piston 242$b$ a further distance to expel liquid from the column 316 through the relief valve for synchronizing purposes. Concurrently with this motion, the cam 238$a$ may recede allowing the piston 60 to return to its fully retracted position.

When the transmitter piston 240$b$ has completed its stroke, the cam 240$d$ will actuate the piston 94 to swing the ejector lever 100 so as to push the work piece, which is in recess 86, out into the discharge conveyor tube 24. It will be understood that should one of the solenoids 124 be energized, it will project one of the stop pins 118 to interrupt the motion of arm 84 at a point in line with one of the other discharge tubes. The transmitter piston 240$b$, however, will continue its motion and discharge the liquid not accepted by motor 70 into the reservoir 312 through the relief valve. The travel of arm 84 may thus be interrupted in any point in its swing by any one of the solenoids 124 and due to the momentary dwell or slow down of the arm as it comes into registry with each conveyor tube, the contact of stop bar 110 with the stop pin 118 is not abrupt. When the piston 60 is fully retracted, the cam 238$c$ will operate the motor piston 48 to swing the escapement arm 40 clockwise in FIGURE 1, thus permitting the stack of work pieces to roll down so that another piece lies on the rails 32.

Thereupon the cam 238a will operate piston 60 to shift the plug 64 into the bore of the work piece 34 holding the latter against the lower end of the escapement arm 40.

As soon as the ejector arm 100 completes its ejector stroke, the cam 238b will enter upon its falling cycle permitting the piston 240b to retract. No matter which of the discharge points the arm 84 happens to be in register with, the return motion will take place under return oil pressure as soon as the first step in the falling ramp of cam 238b comes under the cam follower and the return will take place in repeated accelerating and decelerating movements until the arm 84 of contacts stop 104. Thereupon the further retraction of piston 240b will cause replenishing of the liquid column 316 through the replenishing valve under the slight superatmospheric pressure maintained in reservoir 312. Also during this time the cam 238d will recede and return the ejector lever 100 to its normal position.

In order to perform the gaging or testing of the work piece in coordination with the work handling mechanism, there is provided an electric circuit controlled jointly by the camshaft 236 and by a series of sensing contacts 330, 332, 334, etc., which form part of a series of contacts that may be progressively established as the characteristic of the work piece which is being measured is found to be progressively greater or lesser in value, as the case may be. In the embodiment here illustrated these may take the form of spaced electrodes sealed in the walls of an insulating gaging column 336 forming part of a mercury manometer later to be described.

An auto transformer 338 is connected across the lines L–1 and L–2 and has a low voltage section 340 which supplies a low control voltage to a pair of cam operated switches 342 and 344 operated by the camshaft 236. Switch 342 is arranged to be momentarily closed at the proper point in the cycle when it is desired to initiate a gage reading. This would normally be after the gage plug 64 has entered the bore of a work piece and when the mercury manometer has had a sufficient interval of time to reach a stable position. When switch 342 is closed, the control voltage is applied to the base of the mercury column 336. Each of the electrodes 330, 332, 334, etc., is connected with a corresponding relay 346, 348, and 350, etc., the other side of which is connected to the line L–1. These relays have holding contacts which are supplied with the low control voltage through the cam switch 344 which is arranged to be closed ahead of the closure of switch 342 and to open at some interval thereafter sufficiently long to enable the arm 84 to perform its full advancing stroke toward the stop 106. This enables the sensing circuit to "remember" a reading after a work piece has been removed from gaging position and is being transported to the proper discharge point.

Each of the relays, except the lowermost relay 346, has a pair of normally closed contacts which are in series with the connection to the L–1 side of the line so that the energization of any of the relays automatically de-energizes all of the relays below it. Thus, no matter how many of the electrodes 330, etc., are contacted by the mercury column, only one of the relays will be energized since those above the mercury column will not receive initial energization, and those below the uppermost electrode contacted by the mercury column will be cut out by opening of the normally closed contacts of the highest relay energized. Each of the relays 346, etc., has a pair of normally open output contacts for controlling a corresponding one of the solenoids 124 on the sorting mechanism. One side of each solenoid is connected to line L–1 through the normally closed contacts of the relays above it. Full line voltage is impressed upon the proper solenoid 124 by means of a cam switch 352 connected between line L–2 and the output contacts of all of the relays. Thus, at the proper point in a normal cycle of the mechanism, after a reading is taken and the proper relay is energized, the switch 352 will complete the solenoid circuit to project the proper stop 118 into the path of the work piece handling arm.

Referring now to FIGURES 8 through 14, there is illustrated a pneumoelectric sensing mechanism suitable for use with a variety of gaging or testing heads of the type in which resistance to flow of compressed air may be varied in accordance with the value of a characteristic being measured. The sensing mechanism comprises a main base block 354 having a bore 356 in which the insulating manometer column 336 is mounted. The mercury tube 336 is preferably formed of glass or insulating plastic having a rectangular contact block 351 along one side. The block 351 has a plurality of upwardly inclined bores 353 which form mercury pockets having electrode pins 355 removably sealed in place at their lower ends. The pins may alternatively be arranged to enter horizontally and be formed of copper or other material forming an amalgam with mercury. The block 354 has a compressed air inlet connection 358 which leads to a pair of calibrated fixed orifices 360 and 362. These may take the form of perforated jewels suitably mounted and sealed in their respective bores 366 and 368. The bore 366 connects with a branch conduit 370 which leads by a conduit, not shown, to the hollow passage 62 in the center of the piston and rod assembly 60 in FIGURE 3. This connection serves to conduct a continual small flow of compressed air to the gage plug from the outlet of the orifice plate 360. The pressure between orifice 360 and the gage plug 64 is applied either to the top or the bottom of the mercury column manometer, depending upon the way in which the mechanism is assembled. It will be understood that the connection 370 may be connected to any sort of a gaging head where a pressure differential of varying magnitude may be produced by varying the characteristics of an escape path for the compressed air which passes the orifice 360.

In order to minimize the effect of variable factors, it is preferred to utilize a null balance pneumatic circuit and for this purpose the orifice 362 and bore 368 lead to a manually adjustable, but normally fixed, orifice 372. The size of the orifice 372 is varied by adjusting a leaf spring plate 374 which normally closes the orifice and may be adjustably opened by the adjusting screw 376 and operating pins 378.

On its front face the block 354 carries a diaphragm assembly consisting of a ring 380 and a cover 382 between which there is clamped a flexible diaphragm 384. The mid portion of the diaphragm 384 is clamped between a pair of stop plates 386, whose motion may be limited by a pair of adjustable stop plungers 388 carried in central bores in the block 354 and the cover 382, respectively. The volume of space on the left-hand side of the diaphragm in FIGURE 8 is filled with mercury, the level of which in the manometer tube 336 will vary in accordance with the motion of the diaphragm 384 to the right or left in FIGURE 8. The chamber on the right-hand side of the diaphragm 384 may be selectively connected either with the bore 366 by means of a transverse passage 390 or with the pressure in bore 368 by means of a tranverse passage 392. For this purpose the ring 380 and the cover 382 are provided with an L-shaped passage 394, which in one position of assembly will register with the passage 390 and in another position, 180° away, will register with the passage 392.

The upper end of the glass column 336 is provided with a connection fitting 396 which is connected by means of a tube 398 with a passage formed in the ring 380 and cover 382 at a point diametrically opposite the L-shaped passage 394. Thus, when passage 394 is in communication with transverse passage 390, the passage 400 will be in communication with the transverse passage 392. When the ring and cover are rotated 180°, these connections will be reversed. The former connection is shown diagrammatically in FIGURE 12, while the latter connection is illustrated in FIGURE 13.

The pneumo-electric sensing mechanism will be seen to operate as a pressure gage for measuring the pressure intermediate the orifice 360 and the gaging orifice in the head 64, or other gaging device. When the gaging orifice is large, the pressure in bore 366 will be low, since most of the pressure drop from inlet 358 to the outlet at the gaging head 64 will take place in the orifice 360. Thus, a large diameter bore in a work piece being gaged will generate a low value of pressure in the bore 366.

In the circuit of FIGURE 12 this pressure applied in the right-hand diaphragm chamber will result in a low level of the mercury in column 336. In the circuit of FIGURE 13, on the other hand, such a large bore in the work piece would result in a high level of mercury in the column 336 generated by the constantly applied intermediate pressure in the bore 368 acting upon the right-hand side of the diaphragm 384. Thus, a continuing series of parts may be successively gaged by the work piece handling apparatus previously described, and the sensing mechanism will determine which of the gaging relays is closed and which solenoid 124 will be energized to determine the final discharge position of a work piece which has just been gaged.

It will thus be seen that the present invention provides a completely automatic, high speed, and highly sensitive gaging and sorting apparatus, which may be utilized to measure, test, or check work pieces in rapid succession and sort them into categories determined by the results of each check. Likewise, while the selective-distance motion device is disclosed in a form where work pieces are supplied at a single point and discharged at several points it will be understood that by suitable re-arrangement the device may be utilized to select work pieces supplied at a number of points and deliver them to a single discharge point and, in effect reverse the flow of work pieces from that described.

While the form of embodiment of the invention as herein disclosed constitutes a preferred form, it is to be understood that other forms might be adopted, all coming within the scope of the claims which follow.

What is claimed is as follows:

1. An apparatus for sorting articles into a plurality of categories comprising an article supply station, an article carrier shiftable along a predetermined path forwardly away from and reversely back to the supply station, a plurality of article discharge stations positioned along the path to receive articles from the carrier, cam means of predetermined stroke arranged to drive the carrier through the complete distance spanned by the stations along the path, stop means along the path for selectively blocking the carrier while opposite an intermediate one of the stations to restrict the travel of the carrier to a shorter distance, and a yielding drive means interconnecting the cam means and the carrier whereby the cam may travel through its full stroke while the carrier travels less than the full distance.

2. An apparatus for sorting articles into a plurality of categories comprising an article supply station, an article carrier shiftable along a predetermined path forwardly away from and reversely back to the supply station, a plurality of article discharge stations positioned along the path to receive articles from the carrier, cam means of predetermined stroke arranged to drive the carrier through the complete distance spanned by the stations along the path, stop means along the path for selectively blocking the carrier while opposite an intermediate one of the stations to restrict the travel of the carrier to a shorter distance, and a yielding liquid column drive means interconnecting the cam means and the carrier whereby the cam may travel through its full stroke while the carrier travels less than the full distance.

3. An apparatus for sorting articles into a plurality of categories comprising an article supply station, an article carrier shiftable along a predetermined path forwardly away from and reversely back to the supply station, a plurality of article discharge stations positioned along the path to receive articles from the carrier, cam means of predetermined stroke arranged to drive the carrier through the complete distance spanned by the stations along the path and having portions arranged to accelerate and then decelerate the carrier during its travel between adjacent stations, stop means along the path for selectively blocking the carrier while opposite and intermediate one of the stations to restrict the travel of the carrier to a shorter distance, and a yielding drive means interconnecting the cam means and the carrier whereby the cam may travel through its full stroke while the carrier travels less than the full distance.

4. An apparatus for sorting articles into a plurality of categories comprising an article supply station, an article carrier shiftable along a predetermined path forwardly away from and reversely back to the supply station, a plurality of article discharge stations positioned along the path to receive articles from the carrier, cam means of predetermined stroke connected to drive the carrier through the complete distance spanned by the stations along the path and having portions arranged to accelerate and then decelerate the carrier during its travel between adjacent stations.

5. An apparatus for sorting articles into a plurality of categories comprising an article supply station, an article carrier shiftable along a predetermined path to and from the supply station, a plurality of article discharge stations positioned along the path to receive articles from the carrier, a grading device positioned to detect the grade of an article prior to its delivery to a discharge station, means for selectively driving the carrier to any one of the discharge stations, a memory device for retaining the grade of an article during travel of the carrier, and means controlled by the memory device for determining the amount of travel along the path whereby each article will be deposited at a discharge station selected in accordance with its detected grade.

6. An apparatus for sorting articles into a plurality of categories comprising an article supply station, an article carrier shiftable along a predetermined path to and from the supply station, a plurality of article discharge stations positioned along the path to receive articles from the carrier, means adjacent the supply station for detecting the grade of an article and for transferring a graded article to the carrier, means for selectively driving the carrier to any one of the discharge stations, a memory device for retaining the grade of an article during travel of the carrier, and means controlled by the memory device for determining the amount of travel along the path whereby each article will be deposited at a discharge station selected in accordance with its detected grade.

7. An apparatus for sorting articles into a plurality of categories comprising an article supply station, an article carrier shiftable along a predetermined path to and from the supply station, a plurality of article discharge stations positioned along the path to receive articles from the carrier, a pneumo-electric grading device adjacent the supply station, means for transferring an article from the supply station to the grading device and thence to the carrier, driving means for shifting the carrier along the path, and electrically operated selector means connected to the grading device and arranged to variably determine the distance which the carrier will travel along the path whereby an article will be delivered to a discharge station determined by the grading device.

8. An apparatus for sorting articles into a plurality of categories comprising an article supply station, an article carrier shiftable along a predetermined path to and from the supply station, a plurality of article discharge stations positioned along the path to receive articles from the carrier, a pneumo-electric grading device adjacent the supply station including a mercury manometer having serially submersible electrodes, means for transferring an article from the supply station to the grading device and thence to the carrier, driving means for shifting the carrier along the path, and electrically operated selector means connected to the grading device and arranged to variably determine the distance which the carrier will travel along the path whereby an article will be delivered to a discharge station determined by the grading device.

9. An apparatus for sorting articles into a plurality of categories comprising an article supply station, an article carrier shiftable along a predetermined path to and from the supply station, a plurality of article discharge stations positioned along the path to receive articles from the carrier, a pneumo-electric grading device adjacent the supply station, means for transferring an article from the supply station to the grading device and thence to the carrier, cam operated driving means for shifting the carrier along the path, and electrically operated selector means connected to the grading device and arranged to variably determine the distance which the carrier will travel along the path whereby an article will be delivered to a discharge station determined by the grading device.

10. An apparatus for sorting articles into a plurality of categories comprising an article supply station, an article carrier shiftable along a predetermined path to and from the supply station, a plurality of article discharge stations positioned along the path to receive articles from the carrier, a pneumo-electric grading device adjacent the supply station, means for transferring an article from the supply station to the grading device and thence to the carrier, cam operated driving means for shifting the carrier along the path, electrically operated selector means connected to the grading device and arranged to variably determine the limit of travel of the carrier short of its full cam operated stroke, and a yielding liquid column device forming part of the driving means whereby the carrier may be stopped in register with any discharge station as selected by the grading device.

11. A pneumo-electric gaging device for use in automatic checking equipment comprising a manometer having an expansible chamber forming one leg and a transparent tube of predetermined volume with electrodes spaced along its length forming the other leg, means limiting the expansion of the chamber to substantially the volume of the tube, a source of fluid pressure, a fixed orifice and a variable grading orifice, means connecting the orifices in series to the source and a device responsive to the pressure between said orifices for expanding and contracting the chamber in proportion to changes in said pressure.

12. A pneumo-electric gaging device for use in automatic checking equipment comprising a mercury manometer having an expansible chamber forming one leg and a transparent tube with electrodes spaced along its length forming the other leg, passage means containing fluid the pressure of which varies in accordance with a characteristic of an article being graded, and means for subjecting the expansible chamber to said variable fluid pressure and for isolating the mercury from the fluid in the passage means.

13. A pneumo-electric gaging device for use in automatic checking equipment comprising a mercury manometer having electrodes serially engageable by the mercury as the mercury column rises, means for producing pressure changes in the manometer in accordance with a characteristic of an article being graded, a bank of relays, each operable upon submersion of one of the electrodes, means associated with each relay for disabling the relays associated with those electrodes which at the moment are more deeply submersed than the electrode for such relay, holding contacts for each relay, a timing switch connected to all the relays for controlling initial energization thereof, a second timing switch connected to all the holding contacts for controlling deenergization of each relay, and a plurality of selector devices connected to be controlled by the relays.

14. An electric grading device comprising an electric switch having a plurality of electrodes which are progressively shuntable in accordance with the magnitude of a characteristic of an article being graded, a bank of relays electrically connected with the electrodes, each operable upon shunting of a corresponding one of the electrodes, and means preventing energizing of more than one relay at a time.

15. A grading and sorting apparatus comprising an article grading station, a grade detector including a mercury manometer having electrodes serially contacted in accordance with the value of a characteristic of an article being graded, a plurality of discharge stations for receiving graded articles, an article transfer mechanism selectively operable to transfer an article from the grading station to any selected discharge station, and a mechanico-hydraulic drive and control system including a common camshaft having cams for driving the transfer mechanism and additional cam means for rendering the manometer electrodes effective and ineffective at predetermined intervals in a camshaft revolution whereby grading may be performed in coordination with the movements of the transfer mechanism.

16. A grading and sorting apparatus comprising an article grading station, a grade detector including a mercury manometer having electrodes serially contacted in accordance with the value of a characteristic of an article being graded, a plurality of discharge stations for receiving graded articles, an article transfer mechanism selectively operable to transfer an article from the grading station to any selected discharge station, means controlled by the manometer electrodes for selecting a discharge station in accordance with the grade of the article being transferred, and a mechanico-hydraulic drive and control system including a common camshaft having cams for driving the transfer mechanism and additional cam means for rendering the manometer contacts effective and ineffective at predetermined intervals in a camshaft revolution whereby grading may be performed in coordination with the movements of the transfer mechanism.

17. A grading and sorting apparatus comprising an article grading station, a grade detector including a mercury manometer having electrodes serially contacted in accordance with the value of a characteristic of an article being graded, a plurality of discharge stations for receiving graded articles, an article transfer mechanism selectively operable to transfer an article from the grading station to any selected discharge station, a mechanico-hydraulic drive and control system including a common camshaft having cams for driving the transfer mechanism and additional cam means for rendering the manometer contacts effective and ineffective at predetermined intervals in a camshaft revolution whereby grading may be performed in coordination with the movements of the transfer mechanism, and means for driving the camshaft at a rapid speed during article transfer and at a slower speed during article grading.

18. A grading and sorting apparatus comprising an article grading station, a grade detector including a mercury manometer having electrodes serially contacted in accordance with the value of a characteristic of an article being graded, a plurality of discharge stations for receiving graded articles, an article transfer mechanism selectively operable to transfer an article from the grading station to any selected discharge station, means controlled by the manometer electrodes for selecting a discharge station in accordance with the grade of the article being transferred, a mechanico-hydraulic drive and control system including a common camshaft having cams for driving the transfer mechanism and additional cam means for rendering the manometer contacts effective and ineffective at predetermined intervals in a camshaft revolution whereby grading may be performed in coordination with the movements of the transfer mechanism, and means for driving the camshaft at a rapid speed during article transfer and at a slower speed during article grading.

19. Apparatus for driving a movable member selectively through any one of a number of measured distances and return comprising a power driven cam having spaced dwell portions separated by ramps having accelerating and decelerating portions, abutment means engageable with the member for determining the terminus of an advancing motion, abutment means engageable with the member for determining the terminus of a returning motion, at least one of said abutment means comprising a plurality of selectively engageable stops spaced along the path of motion of the member, and a yieldingly resilient motion transfer device connected between the cam and the movable member.

20. Apparatus for driving a movable member selectively through any one of a number of measured distances and return comprising a power driven cam having spaced dwell portions separated by ramps having accelerating and decelerating portions, abutment means engageable with the member for determining selectively any of a plurality of terminal positions of the member after motion in one direction and comprising a plurality of selectively engageable stops spaced along the path of motion of the member, and a yieldingly compliant motion transfer device connected between the cam and the movable member.

21. Apparatus for driving a movable member selectively through any one of a number of measured distances and return comprising a power driven cam having spaced dwell portions separated by ramps having accelerating and decelerating portions, abutment means engageable with the member for determining selectively any of a plurality of terminal positions of the member after motion in one direction and comprising a plurality of selectively engageable stops spaced along the path of motion of the member, and a yieldingly compliant motion transfer device connected between the cam and the movable member including a liquid colum device having a pressure-responsive relief and replenishing connection to a liquid reservoir.

References Cited in the file of this patent
UNITED STATES PATENTS

| | | |
|---|---|---|
| 2,421,484 | Diamond | June 3, 1947 |
| 2,571,557 | Fortier | Oct. 16, 1951 |
| 2,593,958 | Aller | Apr. 22, 1952 |
| 2,742,150 | Rendel | Apr. 17, 1956 |
| 2,845,792 | Eisenhardt | Aug. 5, 1958 |
| 2,846,871 | Worthen | Aug. 12, 1958 |

FOREIGN PATENTS

| | | |
|---|---|---|
| 889,130 | France | Sept. 20, 1943 |